Feb. 21, 1961 H. L. LEA Re. 24,937
METHOD FOR FABRICATING A CARPET UNIT
Original Filed April 30, 1959
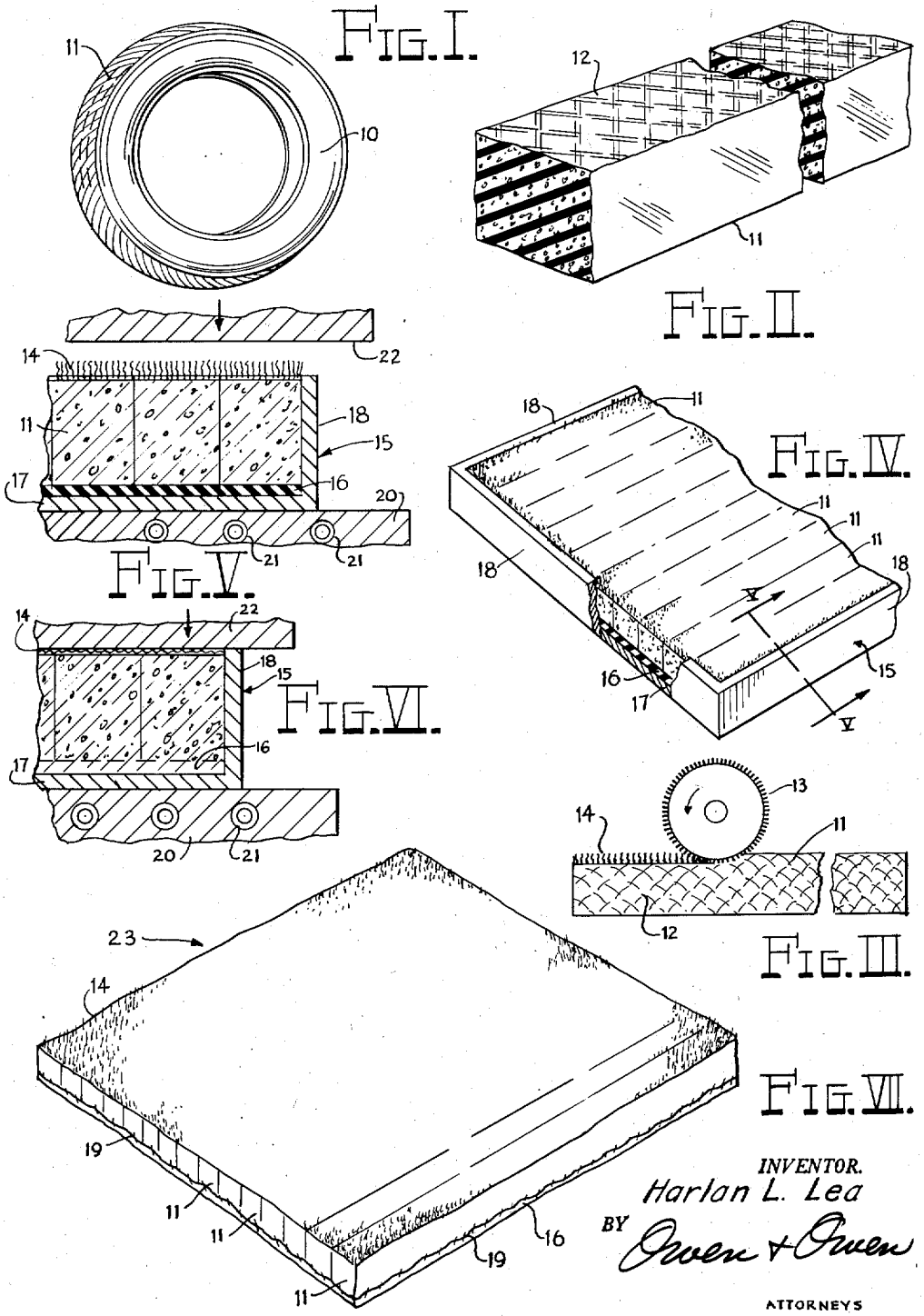
INVENTOR.
Harlan L. Lea
BY Owen & Owen
ATTORNEYS United States Patent Office Re. 24,937
Reissued Feb. 21, 1961

24,937

METHOD FOR FABRICATING A CARPET UNIT

Harlan L. Lea, Wapakoneta, Ohio, assignor to D. W. Moor Rubber Corporation, Wapakoneta, Ohio, a corporation of Ohio Original No. 2,930,729, dated Mar. 29, 1960, Ser. No. 810,169, Apr. 30, 1959. Application for reissue July 28, 1960, Ser. No. 46,043

3 Claims. (Cl. 154—118)

Matter enclosed in heavy brackets [ ] appears in the original patent but forms no part of this reissue specification; matter printed in italics indicates the additions made by reissue.

This invention relates to a method for fabricating a carpet unit and more particularly to a method for fabricating a unit of carpeting which may be handled, assembled and laid in a manner similar to the manner in which so-called tiles made from rubber, cork, vinyl resin, etc., are laid.

The method of the invention has for its principal object the utilization of waste material and the treatment of that material in such manner as to assemble it into a carpet unit or mat of standard modular dimension which can be assembled with similar units for the covering of a floor or other surface with a carpet-like material having great strength and resistance to wear. The carpet unit fabricated according to the invention has particular utility in places such as public elevators, public corridors, etc., where it is desired to provide cushioning material for people walking therethrough and where it is desired to also have the carpet function for the purpose of wiping and cleaning the shoes of the passers-by.

It is another object of the invention to provide a method for utilizing an otherwise waste material for the fabrication of carpet units from which carpet-like areas of floor covering can be readily fabricated and which will possess great wearing qualities.

These and more specific objects and advantages will be readily understood from the specification which follows and from the drawings illustrating various steps of the method according to the invention, in which:

Fig. I is a view on a small scale and in perspective of a pneumatic tire carcass which serves as a source of raw material from which the carpet unit is fabricated according to the invention;

Fig. II is a fragmentary view partly in section and partly in perspective of a strip of material cut from the tire carcass in Fig. I;

Fig. III is a vertical sectional view, somewhat diagrammatic in nature, illustrating how the pieces such as the piece illustrated in Fig. II are initially treated to place them in condition for assembly into a carpet unit according to the invention;

Fig. IV is a fragmentary view in perspective illustrating the assembly of a group of treated pieces for the fabrication of a carpet unit according to the invention;

Fig. V is a fragmentary, vertical, sectional view on an enlarged scale, taken along the line V—V of Fig. IV;

Fig. VI is a view similar to Fig. V but showing the assembled pieces of carpeting being unitized; and Fig. VII is a perspective view of a carpet unit fabricated according to the method of the invention.

This invention consists of a method for fabricating carpet units from pile strips which have been fabricated from waste tire carcasses according to Weiner Patent No. 2,338,828, issued January 11, 1944, and the description of the method according to the invention will be prefaced in this specification by a brief description of the manner in which the basic pile strips are fabricated according to the Weiner disclosure.

A tire carcass 10 consists of a plurality of plies or layers of woven fabric embedded in a body of rubber. The tire carcass is made by laminating the layers of fabric in the rubber in such a way that, looking down upon the face of the tread area of the tire carcass, the threads of the fabric extend on the bias relative to the axis of the tire. After the tire carcass has been utilized sufficiently long so that its tread area is completely removed and the carcass is not suitable for further retreading or recapping, it becomes what amounts to a waste material. According to the Weiner patent, circumferentially extending strips of this waste material are sliced from the carcass. Such a strip is indicated by the dotted line 11 in Fig. I and shown in fragmentary perspective in Fig. II.

The strip 11, when cut from the tire carcass 10, has the layers of fabric generally indicated at 12 extending horizontally therein with the threads of the fabric extending on the bias relative to both the length and transverse dimension of the strip 11. Proceeding according to the Weiner patent, the strip 11 is run through a machine with its fabric layers turned on edge as shown in Fig. III, and fed beneath a picker wheel diagrammatically indicated by the reference number 13 in Fig. III which rotates against the upper surface of the strip 11 to cut away masses of rubber between the ends of the cords in the fabric layers 12. This leaves a plurality of tufts generally indicated at 14 extending upwardly from the upper surface of the strip 11, the tufts forming a pile on the strip much like the pile formed in a conventional woven carpet.

After the strips 11 are prepared according to the Weiner disclosure and as briefly described above, a plurality of strips of selected length are assembled together in parallel adjacent relationship as shown in Fig. IV. In Fig. IV strips 11 are shown placed side by side within the confines of a molding tray generally indicated at 15 and on a thin layer of uncured rubber 16 which is spread over a solid bottom 17 thereof. Side walls 18 of the tray 16 are slightly lower than the combined thickness of the strips 11 and the layer 16.

Prior to the assembly of the strips 11 in the tray 15, the layer 16 of uncured rubber is spread over the bottom of the tray 15. While the layer 16 may be merely uncured rubber, a stronger and more wear resistant structure may be fabricated by using a layer of rubber friction stock comprising uncured rubber in which is embedded a nylon or rayon fabric 19 (see Fig. VII). If such a sheet of friction stock is prepared, it is cut in, say, ⅛″ slabs having lateral dimensions equal to the lateral dimensions of the carpet units to be fabricated, and, after suitable aging and cleaning, is placed in the bottom of the tray 15.

After the assembly of the strips 11 on the layer 16 in the tray 15, the tray 15 containing the group of strips 11 is placed upon a platen 20 having heating coils 21 therein and located beneath a flat surface, movable platen 22 of a suitable press. The upper platen 22 is then closed downwardly to tightly compress the mass of strips 11 and the rubber layer 16 together, and heated to a temperature of about 300 to 320° F. and at, say, 500 pounds per square inch pressure, the press being left closed for a period of six minutes or so to cure and vulcanize the rubber together into a unitary structure.

A unitary carpet structure 23 made according to the invention is shown in perspective in Fig. VII. The lateral dimensions of this structure are chosen to be modular in size, for example 9″ by 9″, or 12″ by 12″, so that complete floor areas may be covered by assembling unitary structures such as the structure 23 of Fig. VII together in adjacent edge to edge relationship and bonding them to the surface to be covered by a suitable surface adhesive.

A carpet unit 23 prepared according to the invention (which may or may not include the base reinforcing material 19) has the advantage that each of the threads forming the pile of tufts 14 is securely bonded into the body of the rubber of the strips 11 and, through vulcanization and curing, to the base layer 16 so that the several strips lose their identity and become a single unitary structure. Because the tufts 14 are so tightly bonded in the bodies of the strips 11 and thus into the carpet unit 23, each individual thread is protected by the body of the unit 23, and dirt and grit which is forced into the pile of the tufts 14 does not break off the individual threads forming the tufts 14. The carpet unit 23 assembled with similar units to form an area of carpeting is thus extremely resistant to wear and yet may be cleaned in a manner similar to other carpeting by vacuuming or by suitable scrubbing.

Because the carpet units 23 have modular lateral dimensions, numbers of them may be assembled together in a manner similar to the laying of tiles to provide, for example, a wall to wall carpeting layer in locations receiving extreme wear and they may be laid by much less skilled labor than is required to lay ordinary carpeting in the locations in question.

I claim:

1. A method for fabricating a carpet unit comprising, cutting circumferentially extending strips of material from the tread portion of a fabric reinforced pneumatic tire casing, said strips having identical rectilinear cross sections and lengths many times their transverse dimensions, abrading the sides of said strips for removing the rubber matrix from between the reinforcing cords therein for exposing the ends of said cords to a depth sufficient for exposing an appreciable textile pile, forming a layer of uncured rubber in the bottom of a pan having a length and width equal to the lateral dimensions of the unit to be fabricated, cutting said strips to a length equal to the interior length of said pan, assembling a plurality of said strips in tight parallel relationship in said pan and on said layer of uncured rubber with the exposed textile pile uppermost, the sides of said pan extending upwardly less than the height of the bodies of said strips, applying heat to said pan and compressing said strips and layer together in a direction normal to their faces for curing and vulcanizing said strips and said layer into a unitary structure.

2. A method according to claim 1 in which a layer of reinforcing fabric is embedded in said layer of uncured rubber before said strips are assembled thereon.

*3. A method for fabricating a carpet unit comprising, cutting circumferentially extending strips of material from the tread portion of a fabric reinforced pneumatic tire casing, said strips having identical rectilinear cross sections and lengths many times their transverse dimensions, abrading the sides of said strips for removing the rubber matrix from between the reinforcing cords therein for exposing the ends of said cords to a depth sufficient for exposing an appreciable textile pile, forming a layer of uncured rubber in the bottom of a pan having a length and width equal to the lateral dimensions of the unit to be fabricated, cutting said strips to a length equal to the interior length of said pan, assembling a plurality of said strips in parallel relationship in said pan and on said layer of uncured rubber with the exposed textile pile uppermost, the sides of said pan extending upwardly less than the height of the bodies of said strips, applying heat to said pan and compressing said strips and layer together in a direction normal to their faces for curing and vulcanizing said strips and said layer into a unitary structure.*

References Cited in the file of this patent or the original patent

UNITED STATES PATENTS

| | | |
|---|---|---|
| 1,746,948 | King | Feb. 11, 1930 |
| 1,815,558 | Gammeter | July 21, 1931 |
| 2,144,683 | McClung | Jan. 24, 1939 |

FOREIGN PATENTS

| | | |
|---|---|---|
| 460,067 | Great Britain | Jan. 20, 1937 |